US009075276B2

(12) United States Patent
Tateno et al.

(10) Patent No.: US 9,075,276 B2
(45) Date of Patent: Jul. 7, 2015

(54) ELECTRO-OPTICAL DEVICE AND ELECTRONIC APPARATUS WITH A PIXEL THAT TRANSMITS LIGHT WITH PEAK TRANSMITTANCES IN THE WAVELENGTH RANGES OF RED, GREEN, AND BLUE

(75) Inventors: Yoshitake Tateno, Chitose (JP); Satoshi Ito, Eniwa (JP)

(73) Assignee: Seiko Epson Corporation, Tokyo (JP)

( * ) Notice: Subject to any disclaimer, the term of this patent is extended or adjusted under 35 U.S.C. 154(b) by 277 days.

(21) Appl. No.: 13/548,292

(22) Filed: Jul. 13, 2012

(65) Prior Publication Data

US 2013/0021555 A1 Jan. 24, 2013

(30) Foreign Application Priority Data

Jul. 22, 2011 (JP) ................. 2011-160718

(51) Int. Cl.
*G02F 1/1343* (2006.01)
*G02F 1/136* (2006.01)
*G02F 1/1362* (2006.01)

(52) U.S. Cl.
CPC ........... *G02F 1/136213* (2013.01); *G02F 2001/136222* (2013.01); *G02F 2201/40* (2013.01)

(58) Field of Classification Search
CPC .............................. G02F 1/136213
USPC ........................... 349/39, 42, 147
See application file for complete search history.

(56) References Cited

U.S. PATENT DOCUMENTS

| 5,457,553 A * | 10/1995 | Mori ................. 349/39 |
| 5,966,190 A * | 10/1999 | Dohjo et al. ........... 349/39 |
| 6,958,748 B1 | 10/2005 | Fukui et al. |
| 2010/0171131 A1 | 7/2010 | Iki |
| 2014/0284579 A1* | 9/2014 | Tokuda et al. ............ 257/40 |

FOREIGN PATENT DOCUMENTS

| JP | 9-281517 A | 10/1997 |
| JP | 2004-184579 A | 7/2004 |
| JP | 2005-47178 A | 2/2005 |
| JP | 2010-176119 A | 8/2010 |
| JP | 2010-266605 A | 11/2010 |
| WO | WO-00-63924 A | 10/2000 |

* cited by examiner

*Primary Examiner* — Huyen Ngo
(74) *Attorney, Agent, or Firm* — ALG Intellectual Property, LLC

(57) ABSTRACT

A liquid crystal device as an electro-optical device of a present application example includes an element substrate, a translucent pixel electrode disposed on the pixel, a storage capacitor which is provided between the element substrate and the pixel electrode and has a pair of translucent electrodes disposed to face each other through a dielectric layer, and a third interlayer insulator film provided between the storage capacitor and the pixel electrode, and each of film thicknesses of the pixel electrode, a first electrode and a second electrode as the pair of translucent electrodes and the third interlayer insulator film are set so that a spectral distribution of light which transmits the pixel has peak transmittances corresponding to each of wavelength ranges of at least red, green and blue.

5 Claims, 11 Drawing Sheets

FIG. 7A

| (nm) | EMBODIMENT 1 | EMBODIMENT 2 | EMBODIMENT 3 | EMBODIMENT 4 |
|---|---|---|---|---|
| PIXEL ELECTRODE | 140 | 133 | 147 | 154 |
| THIRD INTERLAYER INSULATOR | 175 | 175 | 175 | 175 |
| SECOND ELECTRODE | 140 | 133 | 147 | 140 |
| FIRST ELECTRODE | 140 | 133 | 147 | 140 |

FIG. 7B

| (nm) | EMBODIMENT 5 | EMBODIMENT 6 | EMBODIMENT 7 | EMBODIMENT 8 | EMBODIMENT 9 | EMBODIMENT 10 |
|---|---|---|---|---|---|---|
| PIXEL ELECTRODE | 140 | 140 | 140 | 140 | 133 | 147 |
| THIRD INTERLAYER INSULATOR | 166 | 158 | 184 | 192 | 166 | 166 |
| SECOND ELECTRODE | 140 | 140 | 140 | 140 | 133 | 147 |
| FIRST ELECTRODE | 140 | 140 | 140 | 140 | 133 | 147 |

FIG. 7C

| (nm) | COMPARISON EXAMPLE 1 | COMPARISON EXAMPLE 2 | COMPARISON EXAMPLE 3 | COMPARISON EXAMPLE 4 | COMPARISON EXAMPLE 5 | COMPARISON EXAMPLE 6 |
|---|---|---|---|---|---|---|
| PIXEL ELECTRODE | 140 | 140 | 100 | 126 | 154 | 154 |
| THIRD INTERLAYER INSULATOR | 100 | 250 | 175 | 175 | 175 | 158 |
| SECOND ELECTRODE | 140 | 140 | 100 | 126 | 154 | 154 |
| FIRST ELECTRODE | 140 | 140 | 100 | 126 | 154 | 154 |

ELECTRO-OPTICAL DEVICE AND ELECTRONIC APPARATUS WITH A PIXEL THAT TRANSMITS LIGHT WITH PEAK TRANSMITTANCES IN THE WAVELENGTH RANGES OF RED, GREEN, AND BLUE

BACKGROUND

1. Technical Field

The present invention relates to an electro-optical device and an electronic apparatus.

2. Related Art

As the electro-optical device, there is an active drive type liquid crystal device used as an optical modulator (light valve) of a liquid crystal projector, for example. A pixel of the liquid crystal device has a pixel electrode, a transistor which controls switching of the pixel electrode, and a pixel circuit including a storage capacitor for holding an image signal written in the pixel electrode.

In such a liquid crystal device, there have been attempts to increase the number of pixels, for example, to realize more excellent display quality. To increase the number of pixels without changing the size of the liquid crystal device brings high definition of the pixels and there remain problems of how to make the size of the transistor compact and secure the storage capacitor having predetermined electrical capacitance.

In order to solve the problems, an electro-optical device which includes a transparent conductive film provided on an upper layer of a transistor element, a dielectric layer formed above the transparent conductive film and a transparent pixel electrode which constitutes a storage capacitor along the transparent conductive film and the dielectric layer and is electrically connected to the transistor element in an aperture region through which light of a display region can be transmitted is disclosed in JP-A-2010-176119.

According to the electro-optical device described above, since the storage capacitor is configured in the aperture region, in comparison with a case when the storage capacitor is formed in a non-aperture region, it is possible to secure the predetermined electrical capacitance of the storage capacitor regardless of the high definition of the pixel.

However, when only overlapping the transparent conductive film and the pixel electrode with the translucent dielectric layer interposed therebetween, there is a concern that it may not be possible to always obtain the predetermined transmittance since the light which transmits the aperture region may be absorbed into the thin film layers and the light may be reflected on an interface of the thin film layers. In other words, when the translucent storage capacitor is provided in the aperture region of the pixel, there remains a problem that it is necessary to optimize the transmittance of the light which transmits the aperture region.

SUMMARY

The invention can be realized in the following forms or application examples.

Application Example 1

According to Application Example 1, there is provided an electro-optical device including a substrate; a translucent pixel electrode disposed on a pixel; a storage capacitor which has a pair of translucent electrodes disposed to face each other through a dielectric layer between the substrate and the pixel electrode; an interlayer insulator film between the storage capacitor and the pixel electrode, and wherein each of film thicknesses of the pixel electrode, the pair of translucent electrodes and the interlayer insulator film are set so that a spectral distribution of light, which is transmitted through the pixel, has peak transmittances corresponding to each of wavelength ranges of at least red, green and blue.

According to the configuration, since each of the film thicknesses of the pixel electrodes, the pair of translucent electrodes which constitutes the storage capacitor and the interlayer insulator film disposed therebetween are adjusted and are set, it is possible to provide an electro-optical device in which the transmittance of the light in the aperture region of the pixel shows a high value over a wavelength range of visible light.

Application Example 2

In the electro-optical device, according to Application Example 1, the pixel electrode and the pair of translucent electrodes are configured of ITO films, one film thickness of the ITO film among the ITO films is within a range of 140 nm±10% and film thicknesses of other ITO films are within a range of 140 nm±5%, and the interlayer insulator film is configured of a silicon dioxide film and the film thickness of the silicon dioxide film is within a range of 175 nm±10%.

According to the configuration described above, it is possible to realize an electro-optical device in which the transmittance of the light in the aperture region of the pixel shows a high value using ITO films which are general transparent materials and silicon dioxide films which are general insulating materials in the same manner.

Application Example 3

In the electro-optical device according to Application Example 1 the interlayer insulator film including a first silicon oxide film near the storage capacitor and a second silicon oxide film which is laminated on the first silicon oxide film and is doped with boron.

According to the configuration, since the first silicon oxide film is covered with the second silicon oxide film doped with the boron which is chemically more stable, subsequently, even when the pixel electrode is formed by using, for example, a photo lithography method, it is possible to avoid problems such as the interlayer insulator film being transformed or the film thickness after etching being changed. In other words, as a result, by making the interlayer insulator film have a stable film property and film thickness, it is possible to stably secure a high transmittance in the pixel.

Application Example 4

According to Application Example 4, there is provided an electronic apparatus including the electro-optical device of the application examples described above.

According to the above, it is possible to provide an electronic apparatus in which brighter display quality is realized compared to the related art.

Application Example 5

In the electronic apparatus according to Application Example 4, a light source which illuminates the electro-optical device is further included, and a peak wavelength of optical intensity of each of wavelength ranges of at least red, green and blue light which are emitted from the light source substantially matches a peak wavelength of a transmittance corresponding to each of wavelength ranges of at least red, green and blue in a spectral distribution of light which transmits the pixel of the electro-optical device.

According to the above, it is possible to provide an electronic apparatus in which the light, which is emitted from the light source, may be efficiently utilized and the brighter display quality may be realized.

BRIEF DESCRIPTION OF THE DRAWINGS

The invention will be described with reference to the accompanying drawings, wherein like numbers reference like elements.

FIG. 7A is a table which shows film thicknesses of a first electrode, a second electrode, a third interlayer insulator film and the pixel electrode of embodiments 1 to 4, FIG. 7B is a table which shows film thicknesses of a first electrode, a second electrode, the third interlayer insulator film and the pixel electrode of embodiments 5 to 10 and FIG. 7C is a table which shows film thicknesses of a first electrode, a second electrode, the third interlayer insulator film and the pixel electrode of comparison examples 1 to 6.

DESCRIPTION OF EXEMPLARY EMBODIMENTS

Hereinafter, a specific embodiment of the invention will be described with reference to the drawings. In addition, the drawings which are shown are displayed by being favorably enlarged or reduced so as to make a portion to be described be a recognizable state.

Here, in the embodiment hereinafter, the description of "on the substrate", for example, indicates a case when a component is disposed so as to be connected on the substrate, a case when a component is disposed on the substrate through another component, or a case when a portion of components is disposed to be connected on the substrate and another portion of the components is disposed through other components.

First Embodiment

Liquid Crystal Device

Figure 1A:
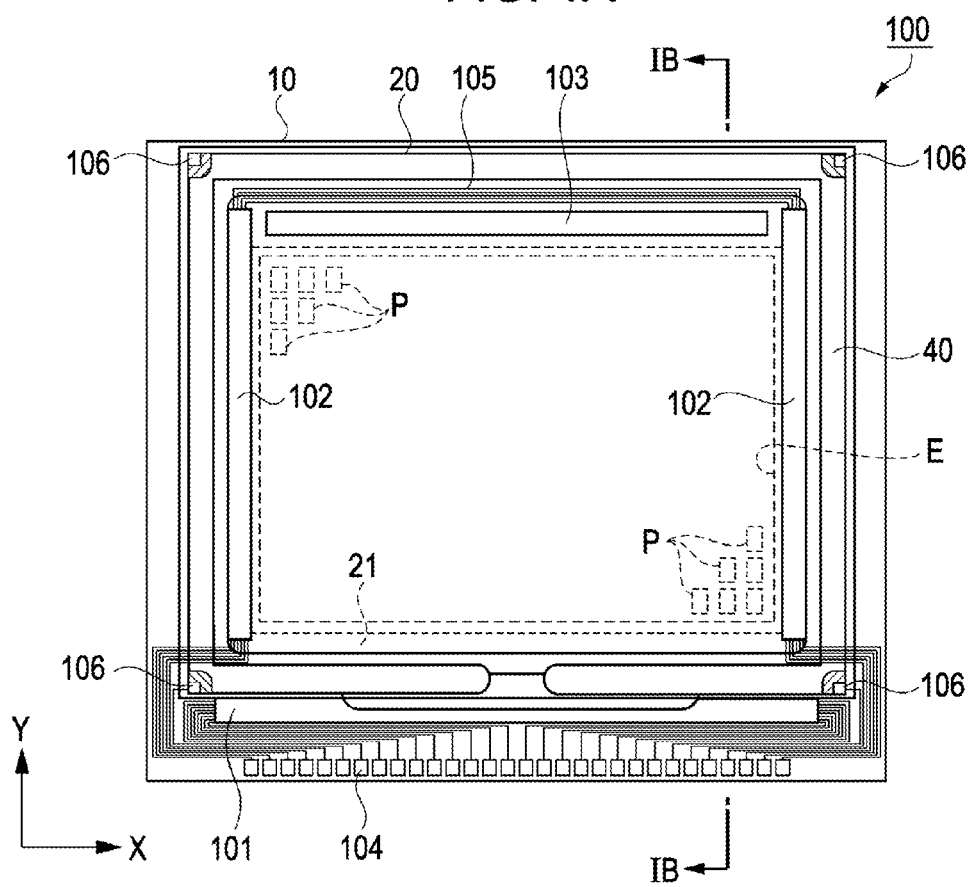
FIG. 1A is a schematic plan view which shows a configuration of a liquid crystal device and FIG. 1B is a schematic cross-sectional view taken along a line IB-IB in FIG. 1A.

First of all, a liquid crystal device as an electro-optical device of the present embodiment will be described with reference to FIG. 1A, FIG. 1B and FIG. 2. FIG. 1A is a schematic plan which shows a configuration of the liquid crystal device, FIG. 1B is a schematic cross-sectional view taken along a line IB-IB in FIG. 1A and FIG. 2 is an equivalent circuit diagram which shows an electrical configuration of the liquid crystal device.

Figure 1B:
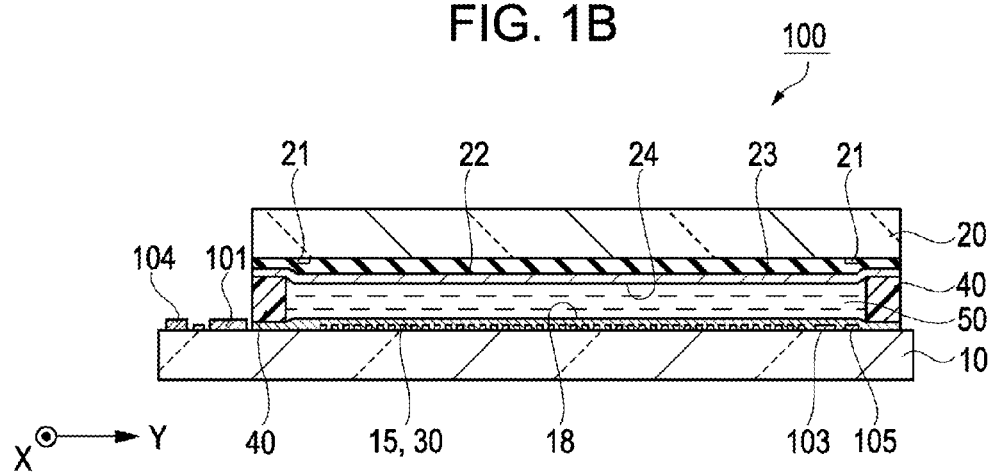
Figure 2:
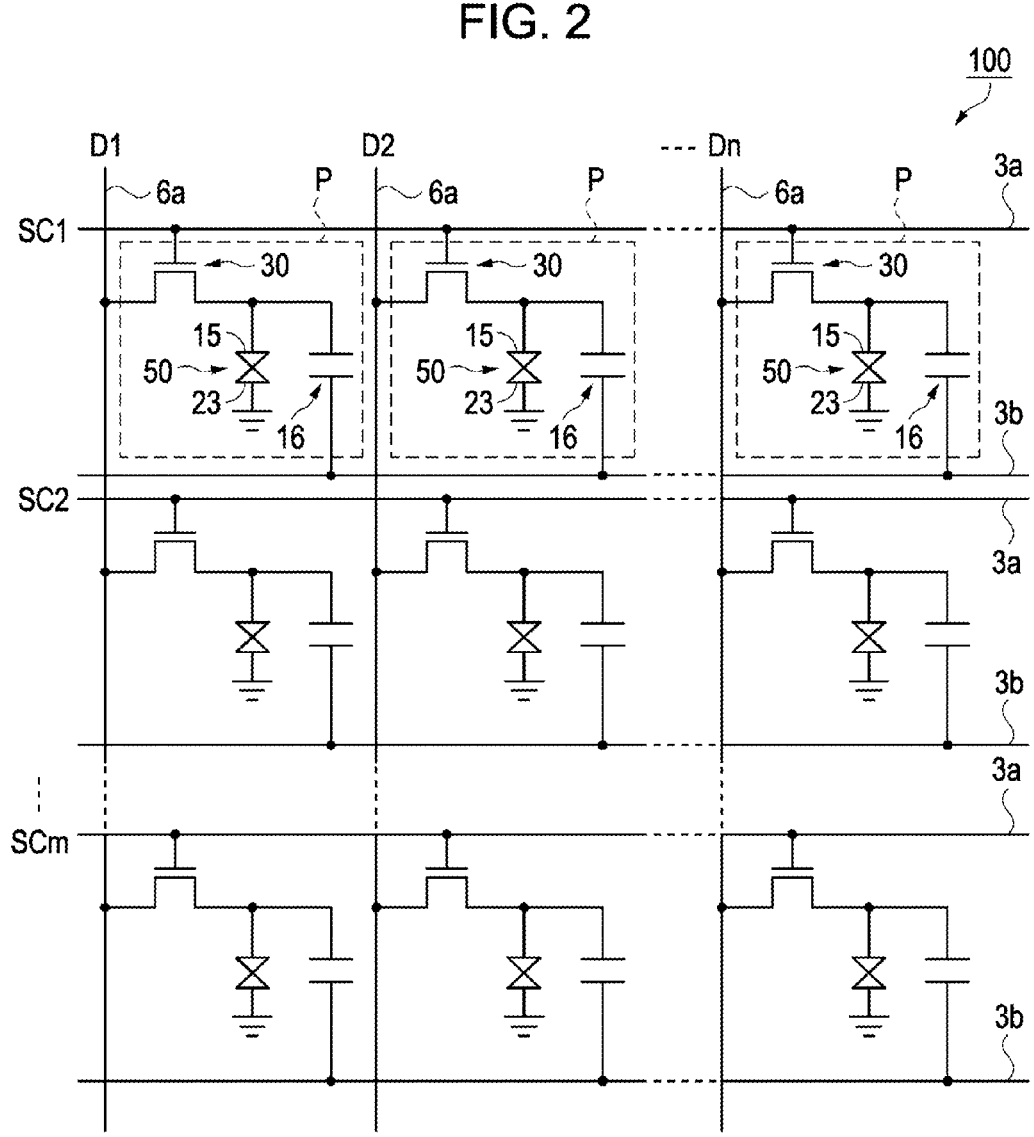
FIG. 2 is an equivalent circuit diagram which shows the electrical configuration of the liquid crystal device.

As shown in FIG. 1A and FIG. 1B, a liquid crystal device 100 as the electro-optical device according to the present embodiment has an element substrate 10 and an opposite substrate 20, which are disposed to face each other and a liquid crystal layer 50 interposed between the pair of substrates. As the element substrate 10 and the opposite substrate 20, for example, a transparent quartz substrate, a glass substrate or the like are used.

The element substrate 10 as the substrate according to the invention is larger than the opposite substrate 20, both substrates come in contact with each other through a sealing material 40 disposed in a frame shape and in the space therebetween, and a liquid crystal having positive or negative dielectric anisotropy is enclosed, thereby constituting the liquid crystal layer 50. As for the sealing material 40, an adhesive such as a thermosetting epoxy resin or an ultraviolet curable epoxy resin is used, for example. In the sealing material 40, a spacer (not shown) is mixed to constantly hold the space between the pair of substrates.

Inside the sealing material 40 disposed in the frame shape, a light shielding film 21 is provided in the same frame shape. The light shielding film 21 is configured by, for example, metal having a light shielding property or metallic oxide and the inside of the light shielding film 21 shows a display region E. In the display region E, a plurality of pixels P is arranged in a matrix shape. It is favorable that the display region E includes a plurality of dummy pixels disposed so as to surround the plurality of pixels P which efficiently contribute to display. Here, a light shielding portion to partition the plurality of pixels P in a plane even in the display region E is provided, however, the portion is omitted in FIG. 1A and FIG. 1B.

A data line driving circuit 101 is provided between the element substrate 10 and the sealing material 40 which is disposed along one side of the element substrate 10. In addition, inside the sealing material 40 along the other side which is opposite the one side, a detection circuit 103 is provided. Furthermore, inside the sealing material 40 along the other two sides perpendicular to the one side, scanning line driving circuits 102 are provided. Inside the sealing material 40 of the other side which is opposite the one side, a plurality of wirings 105 is provided to link the two scanning line driving circuits 102. The wirings which are linked with the data line driving circuit 101 and the scanning line driving circuits 102 are connected to a plurality of external connection terminals 104 arranged along the one side.

Hereinafter, a direction along the one side is set as an X direction and the other two sides, which face each other and perpendicular to the one side is set as a Y direction.

As shown in FIG. 1B, on a surface near the liquid crystal layer 50 of the element substrate 10, pixel electrodes 15 which have optical transparency and provided for each of pixels P, a thin film transistor (hereinafter, refer to as TFT) 30 as a switching element, a signal wiring and an oriented film 18 to cover the plurality of pixel electrodes 15 are formed.

In addition, a light shielding structure is adopted in a semiconductor layer of the TFT 30 to prevent an inappropriate switching operation due to flowing of a light leakage current when the light is incident.

On the surface near the liquid crystal layer 50 of the opposite substrate 20, the light shielding film 21, an interlayer insulator film 22 formed to cover the light shielding film 21, an opposite electrode 23 provided so as to cover the interlayer insulator film 22 over at least the display region E and an oriented film 24 to cover the opposite electrode 23 are provided.

As shown in FIG. 1A, the light shielding film 21 is provided in a frame shape in a position where the data line driving circuit 101, the scanning line driving circuits 102 and the detection circuit 103 are overlapped in a planar manner. Accordingly, the light which is incident from the side of the opposite substrate 20 is blocked to provide a role of preventing a malfunction due to the light of surrounding circuits which include the driving circuits described above. In addition, unnecessary stray light is blocked so as not to be incident in the display region E, thereby securing high contrast of the display of the display region E.

The interlayer insulator film 22 is configured of an inorganic material such as silicon oxide, for example, and provided so as to cover the light shielding film 21 with optical transparency. In addition, the interlayer insulator film 22 serves as a planarization layer which mitigates unevenness generated on the substrate by the light shielding film 21. As a film-forming method of the interlayer insulator film 22 described above, there is a forming method using a plasma CVD method, for example.

The opposite electrode 23 is configured of a transparent conductive film such as an ITO, for example, covers the interlayer insulator film 22 and is electrically connected to the wirings near the element substrate 10 by vertical conduction portions 106 which are provided at four corners on the opposite substrate 20 as shown in FIG. 1A.

The oriented film 18 to cover the pixel electrode 15 and the oriented film 24 to cover the opposite electrode 23 are selected on the basis of an optical design of the liquid crystal device 100. For example, a substantially horizontal orientation process is executed with respect to liquid crystal molecules having positive dielectric anisotropy by film-forming organic materials such as polyimide, for example, and rubbing the surface thereof or a substantially vertical orientation process is executed with respect to liquid crystal molecules having negative dielectric anisotropy by film-forming inorganic materials such as SiOx (silicon oxide) using a vapor growth method.

As shown in FIG. 2, the liquid crystal device 100 has a plurality of scanning lines 3a, a plurality of data lines 6a and capacitance lines 3b which are parallel to the scanning lines 3a as signal lines which are perpendicular to each other while being insulated at least in the display region E.

The pixel electrode 15, the TFT 30 and the storage capacitor 16 are provided in regions partitioned by the scanning lines 3a and the data lines 6a and these regions constitute pixel circuits of the pixels P.

The scanning line 3a is electrically connected to a gate of the TFT 30 and the data line 6a is electrically connected to a source of the TFT 30. The pixel electrode 15 is electrically connected to a drain of the TFT 30.

The data line 6a, which is connected to the data line driving circuit 101 (refer to FIG. 1A and FIG. 1B) supplies image signals D1, D2 to Dn supplied to the pixels P from the data line driving circuit 101. The scanning line 3a which is connected to the scanning line driving circuits 102 (refer to FIG. 1A and FIG. 1B) supplies scanning lines SC1, SC2 to SCm supplied from the scanning line driving circuits 102 to each of the pixels P. The image signals D1 to Dn supplied to the data line 6a from the data line driving circuit 101 may be line sequentially supplied in this order or may be supplied by groups to the plurality of data line 6a groups which are neighboring to each other. The scanning lines SC1 to SCm are in pulse and line sequentially supplied to the scanning lines 3a at predetermined timings by the scanning line driving circuits 102.

The liquid crystal device 100 is configured such that the image signals D1 to Dn supplied from the data lines 6a are written in the pixel electrode 15 at the predetermined timings since the TFT 30, which is a switching element, enters in an ON state for a constant period by inputs of the scanning signals SC1 to SCm. The image signals D1 to Dn of predetermined levels which are written in the liquid crystal layer 50 through the pixel electrode 15 are held between the pixel electrode 15 and the opposite electrode 23 which is disposed to face the pixel electrode 15 with the liquid crystal layer 50 interposed therebetween for a constant period.

In order to prevent the held image signals D1 to Dn from 1, the storage capacitor 16 is connected in parallel to a liquid crystal capacitance formed between the pixel electrode 15 and the opposite electrode 23. The storage capacitor 16 is provided between the drain of the TFT 30 and the capacitance line 3b. In this present embodiment, one of the pair of translucent electrodes which constitute the storage capacitor 16 serves as the capacitance line 3b and the detailed description will be provided later.

In addition, the detection circuit 103 shown in FIG. 1A to which the data line 6a is connected is configured to verify malfunctions of the liquid crystal device 100 by detecting the image signals in a manufacturing process of the liquid crystal device 100, however, is omitted in an equivalent circuit in FIG. 2. Moreover, the detection circuit 103 may include a sampling circuit which supplies the image signal to the data line 6a by performing sampling and a precharge circuit which supplies a precharge signal of a predetermined voltage level to the data line 6a prior to the image signal.

Such a liquid crystal device 100 is a translucent type and in the liquid crystal device 100, an optical design of a normally black mode in which the pixels P are displayed as dark pixels during a non-driving period and a normally white mode in which the pixels P are displayed as bright pixels during the non-driving period is adopted. Based on the optical design, polarization elements are disposed in the respective incident side and emitting side of the light.

Figure 3:
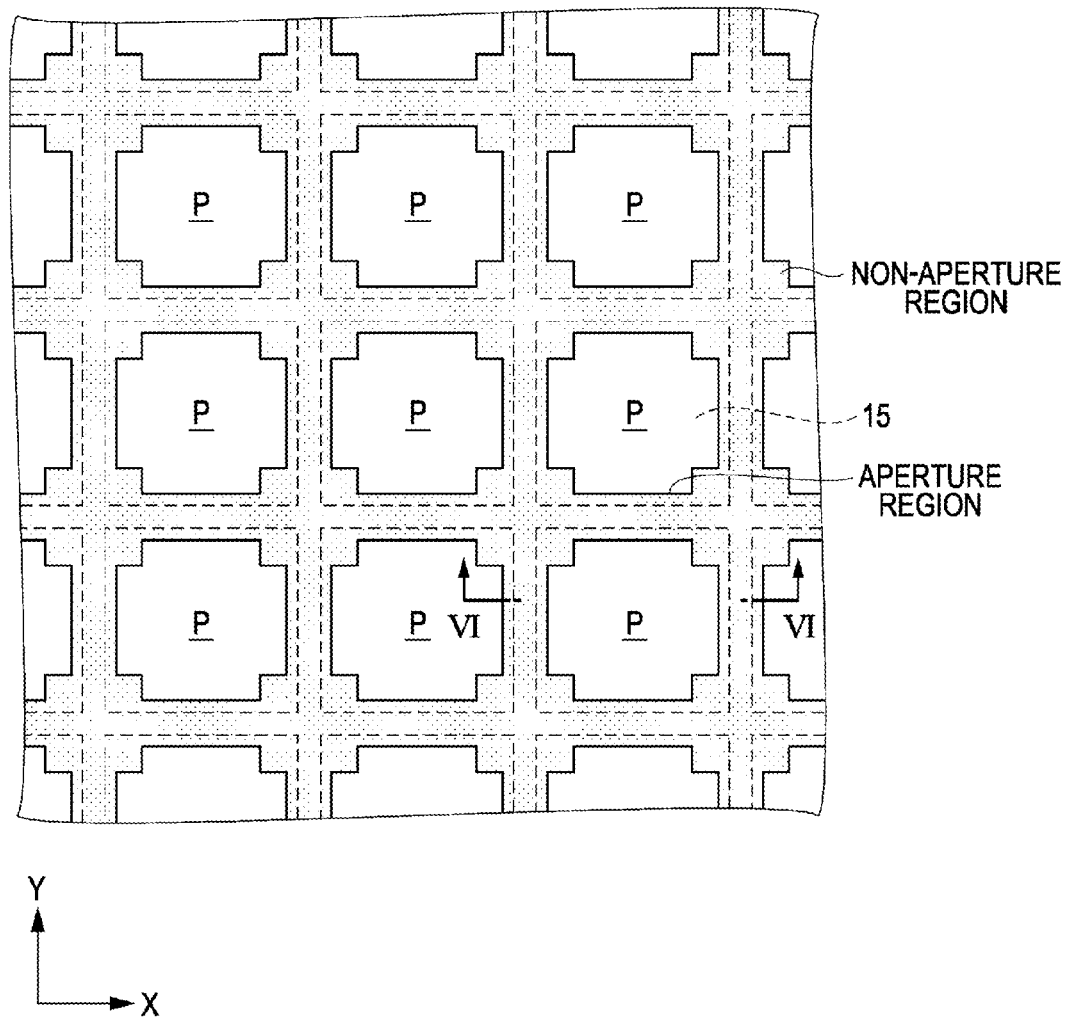
FIG. 3 is a schematic plan view which shows a disposition of a pixel in the liquid crystal device.
Figure 4A:
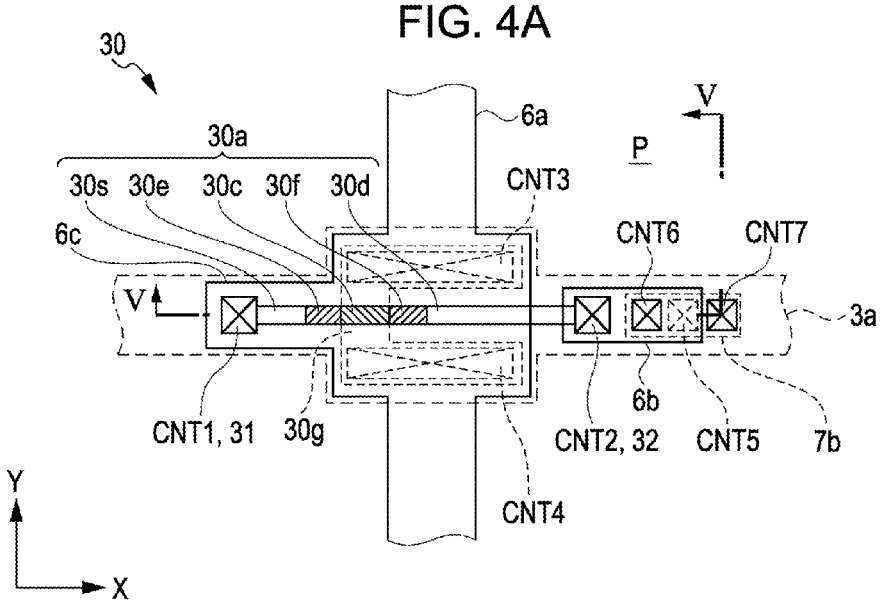
FIG. 4A is a schematic plan view which shows a disposition of a thin film transistor and a signal line of the pixel and FIG. 4B is a schematic plan view which shows a disposition of a pair of translucent electrodes of a storage capacitor of the pixel and a pixel electrode.
Figure 4B:
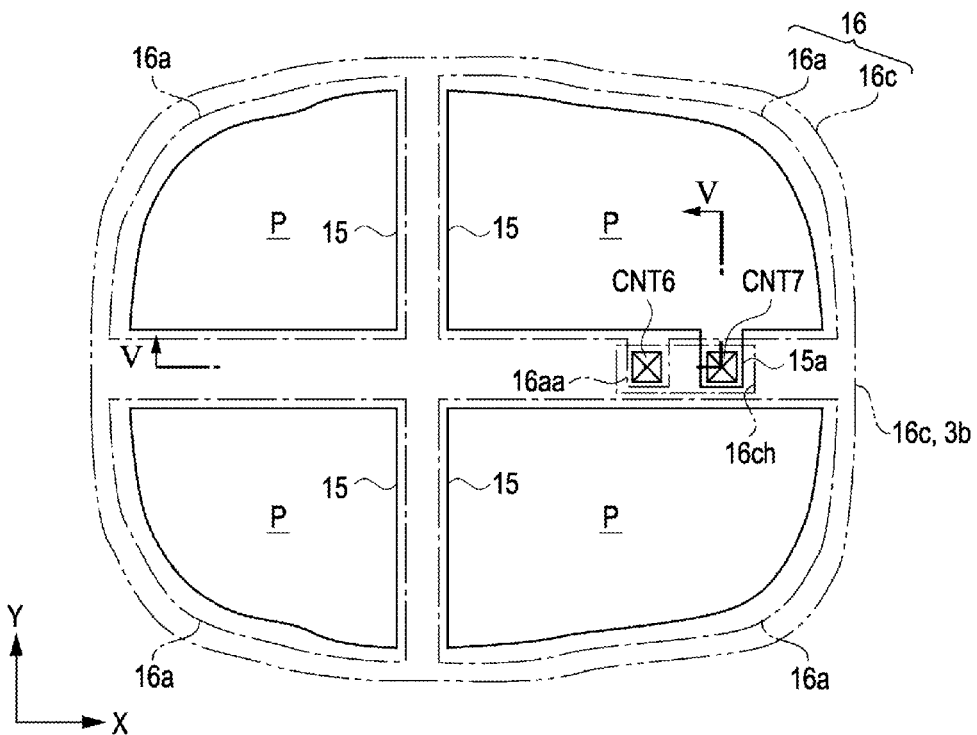
Figure 5:
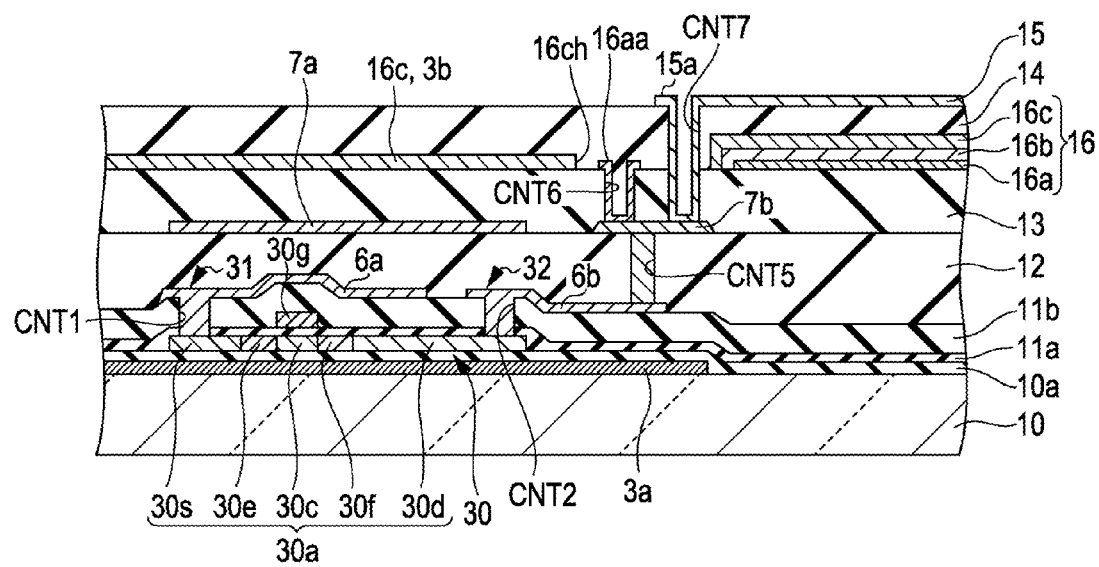
FIG. 5 is a schematic cross-sectional view which shows the configuration of the pixel taken along a line V-V in FIG. 4A and FIG. 4B.
Figure 6:
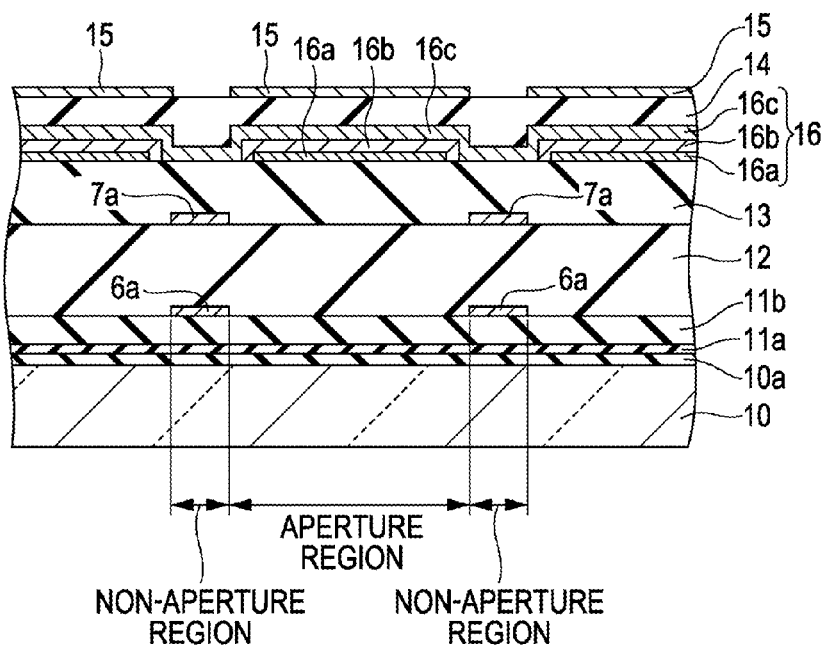
FIG. 6 is a schematic cross-sectional view which shows the configuration of the pixel taken along a line VI-VI in FIG. 3.

Next, plan dispositions and structures of the pixels P will be described with reference to FIG. 3 to FIG. 6. FIG. 3 is a schematic plan view which shows the disposition of the pixel in the liquid crystal device, FIG. 4A is a schematic plan view which shows the disposition of the thin film transistor and the signal line in the pixel, FIG. 4B is a schematic plan view which shows the disposition of the pair of translucent electrodes of the storage capacitor and the pixel electrode in the pixel, FIG. 5 is a schematic cross-sectional view which shows the structure of the pixel taken along a ling V-V shown in FIG. 4 and FIG. 6 is a schematic cross-sectional view which shows the structure of the pixel taken along a line VI-VI shown in FIG. 3.

As shown in FIG. 3, the pixels P of the liquid crystal device 100 include, for example, plan and substantially rectangular (substantially square) aperture regions. The aperture region is surrounded by a light shielding non-aperture region which is provided in a lattice shape while extending in an X direction and a Y direction.

In the non-aperture region which extends in the X direction, the scanning line 3a shown in FIG. 2 is provided. A light shielding conduction member is used for the scanning line 3a and at least a portion of the non-aperture region is configured by the scanning line 3a.

In the same manner, in the non-aperture region which extends in the Y direction, a data line 6a shown in FIG. 2 is provided. A light shielding conduction member is also used for the data line 6a and at least a portion of the non-aperture region is configured by the data line 6a.

The non-aperture region is configured by not only the kind of signal lines described above which is provided near the element substrate 10 but also by the light shielding film 21 which is patterned in a lattice shape near the opposite substrate 20.

In a vicinity of a cross portion of the non-aperture region, the TFT 30 shown in FIG. 2 is provided. By providing the TFT 30 in the vicinity of the cross portion of the non-aperture region having the light shielding property, malfunctions of the light of the TFT 30 is prevented and an aperture ratio in the aperture region is secured. The detailed structure of the pixel P will be described later and here, since the TFT 30 is provided in the vicinity of the cross portion, a width of the non-aperture region in the vicinity of the cross portion is arranged to be wider than the other portions.

Next, each constituent such as the thin film transistor in the pixel circuit of the pixel P will be described with reference to FIG. 4A to FIG. 6.

As shown in FIG. 4A and FIG. 4B, the pixel P has the TFT 30 provided in the cross portion of the scanning line 3a and the data line 6a. The TFT 30 has a semiconductor layer 30a with an LDD (Lightly Doped Drain) structure which has a data line side source/drain region 30s, channel region 30c, pixel electrode side source/drain region 30d, a contact region 30e provided between a data line side source/drain region 30s and the channel region 30c and a contact region 30f provided between the channel region 30c and the pixel electrode side source/drain region 30d. The semiconductor layer 30a passes through the cross portion and is disposed so as to overlap the scanning line 3a.

In the cross portion of the scanning line 3a and the data line 6a, the scanning line 3a has a rectangular expanded portion which extends in the X and Y directions in planar view. A bent shaped gate electrode 30g which is overlapped with the expanded portion in planar view and has an aperture portion which is not overlapped with the contact region 30f and the pixel electrode side source/drain region 30d is provided.

The expanded portion of gate electrode 30g which extends in the Y direction is overlapped with the channel region 30c in planar view. In addition, portions, which extend in the X direction while being bent from the portion overlapped with the channel region 30c and face each other, are electrically connected to the scanning lines 3a by contact holes CNT3 and CNT4 provided between the expanded portions of the respective scanning lines 3a.

The contact holes CNT3 and CNT4 show rectangular shapes (oblong shapes) in which a side in the X direction is longer in planar view and are provided in both sides so as to interpose the contact region 30f along the channel region 30c of the semiconductor layer 30a and the contact region 30f.

The data line 6a extends in the Y direction, has the same rectangular expanded portion in the cross portion with the scanning line 3a, and is electrically connected to the data line side source/drain region 30s by a contact hole CNT1 provided in a protrusion portion 6c which is projected in the X direction from the expanded portion. The portion which includes the contact hole CNT1 is a source electrode 31. On the other hand, a contact hole CNT2 is also provided in an end portion of the pixel electrode side source/drain region 30d and is the portion which includes the contact hole CNT2 is a drain electrode 32.

In the expanded direction (X direction) of the scanning line 3a, contact holes CNT6, CNT5 and CNT7 are provided so as to be adjacent to the contact hole CNT2. The contact hole CNT2 and the contact hole CNT5 are electrically connected to each other through a first relay electrode 6b provided in an island shape. The contact hole CNT6 and contact hole CNT7 are electrically connected to each other through a second relay electrode 7b provided in the island shape in the same manner as above.

As shown in FIG. 4B, the pixel electrode 15 is overlapped with the aperture region (refer to FIG. 3) described above in planar view and is disposed so that outer edge portions stretch over the non-aperture region (refer to FIG. 3). In addition, the pixel electrode 15 has a protrusion 15a to promote the electrical connection to the contact hole CNT7. That is, the pixel electrode 15 shows an island shape of a substantially rectangular shape (substantially square shape) provided in every pixel P.

The storage capacitor 16 has a first electrode 16a and a second electrode 16c as the pair of translucent electrodes. The first electrode 16a is provided so as to be overlapped in planar view with the pixel electrode 15 in the aperture region (refer to FIG. 3) described above in every pixel P. The first electrode 16a has a protrusion 16aa to promote the electric connection with the contact hole CNT6. That is, the first electrode 16a shows an island shape of a substantially rectangular shape (substantially square shape) in the same manner as the pixel electrode 15.

With respect to the above, the second electrode 16c is provided to extend over the plurality of pixels P provided in a matrix shape in the X and Y directions. In addition, the second electrode 16c has an aperture portion 16ch which is open so as not to overlap the second electrode 16c with the contact hole CNT6 to which the first electrode 16a is electrically connected and the contact hole CNT7 to which the pixel electrode 15 is electrically connected. That is, the second electrode 16c is provided to extend to the display region E and serves as the capacitance line 3b which is commonly used in the plurality of pixels P. A portion of the second electrode 16c is expanded in the outer side of the display region E and is electrically connected to a wiring to which a fixed potential is supplied.

As shown in FIG. 5, first of all, the scanning line 3a is formed on the element substrate 10. The scanning line 3a also serves as a light shielding film which shields the semiconductor layer 30a from the light and metal simple substance, alloy, metal silicide, polysilicide or nitride which contains at least one of metals such as, for example, Al, Ti, Cr, W, Ta or Mo or a laminated structure thereof can be used for the scanning line 3a, whereby the light shielding property is obtained.

A base insulating film 10a configured of silicon oxide, for example, is formed to cover the scanning line 3a and the semiconductor layer 30a is formed on the base insulating film 10a in an island shape. The semiconductor layer 30a is configured of a polycrystalline silicon film, for example, and an LDD structure which has the data line side source/drain region 30s, the contact region 30e, the channel region 30c, the contact region 30f and the pixel electrode side source/drain region 30d described above is formed by doping impurity ions.

A first isolating film (gate insulator) 11a configured of silicon oxide or the like, for example, is formed so as to cover the semiconductor layer 30a. Furthermore, the gate electrode 30g is formed in a position which faces to the channel region 30c while interposing the first isolating film 11a. The gate electrode 30g can be formed using a polycrystalline silicon film, for example, and at the same time, the contact holes CNT3 and CNT4 (not shown) which electrically connect the scanning line 3a (expanded portion) and the gate electrode 30g are also formed by penetrating the base insulating film 10a and the first isolating film 11a.

A second isolating film 11b configured of silicon oxide, for example, is formed so as to cover the gate electrode 30g and the first isolating film 11a. On the data line side source/drain region 30s of the semiconductor layer 30a, the contact hole CNT1 which penetrates the overlapped first isolating film 11a and second isolating film 11b is formed. In the same manner, on the pixel electrode side source/drain region 30d of the semiconductor layer 30a, the contact hole CNT2 which penetrates the overlapped first isolating film 11a and the second isolating film 11b is formed. Next, by forming a conduction film configured of a light shielding metal such as Al, for example, and performing patterning so as to cover the second isolating film 11b, the data line 6a which is electrically connected to the data line side source/drain region 30s through the contact hole CNT1 is formed. At the same time, the first relay electrode 6b which is electrically connected to the pixel electrode side source/drain region 30d through the contact hole CNT2 is formed.

Next, A first interlayer insulator film 12 is formed so as to cover the data line 6a and the first relay electrode 6b. The first interlayer insulator film 12 is configured of an oxide, nitride or oxynitride of silicon for example, and a planarization process which makes unevenness on the surface, which occurs due to covering of the region in which the TFT 30 is provided, flat is executed. As a planarization process method, there is a chemical mechanical polishing process (CMP process) or a spin coating process, for example.

The contact hole CNT5 which penetrates the first interlayer insulator film 12 is formed in a position in which the first relay electrode 6b is overlapped. By forming a conduction film configured of a light shielding metal such as Al, for example, and performing patterning, a wiring 7a and a second relay electrode 7b which is electrically connected to the first relay electrode 6b through the contact hole CNT5 are formed as to coat the contact hole CNT5 and cover the first interlayer insulator film 12.

The wiring 7a is formed so as to overlap the semiconductor layer 30a of the TFT 30 and the data line 6a in planar view and also serves as a shielding layer after the fixed potential is given.

A second interlayer insulator film 13 is formed so as to cover the wiring 7a and the second relay electrode 7b. The second interlayer insulator film 13 also can be formed using an oxide, nitride or oxynitride of silicon for example, and the planarization process such as the CMP process is executed.

Next, the contact hole CNT6 which penetrates the second interlayer insulator film 13 is formed in a position in which the CNT6 is overlapped with the second relay electrode 7b. The first electrode 16a which has the protrusion portion 16aa is formed by forming a transparent conductive film such as an ITO and patterning the film so as to coat the contact hole CNT6 and to cover the second interlayer insulator film 13.

The first electrode 16a is electrically connected to the second relay electrode 7b through the protrusion portion 16aa and the contact hole CNT6.

A dielectric layer 16b is formed in a portion which faces the second electrode 16c at least among the first electrode 16a. As the dielectric layer 16b, a single layer film such as a silicon nitride film, hafnium oxide ($HfO_2$), alumina ($Al_2O_3$), or tantalum oxide ($Ta_2O_5$) or a multilayer film in which at least two single layer films among these single layer films are laminated can be used. The thickness is arranged to be 20 nm to 30 nm when considering the electrical capacitance. The dielectric layer 16b is such an ultra thin film and has high transparency with respect to visible light.

The second electrode 16c which serves as the capacitance line 3b is formed so as to cover the dielectric layer 16b by forming a transparent conductive film of such as an ITO, for example, and patterning the film. The second electrode 16c is formed so as to cover the surface which includes a side surface of the dielectric layer 16b in which the patterning is performed. In addition, as described above, the second electrode 16c is formed while extending to at least the display region E in which the plurality of pixels P is included and an aperture portion 16c h is formed in a portion in which the second electrode 16c is overlapped with the second relay electrode 7b in planar view.

Therefore, the translucent storage capacitor 16 is configured by disposing the first electrode 16a and the second electrode 16c with the dielectric layer 16b interposed therebetween to face each other.

A third interlayer insulator film 14 as an interlayer insulator film according to the invention is formed while covering the storage capacitor 16. The third interlayer insulator film 14 can be formed using a silicon oxide, for example, and a planarization process such as a CMP process may be executed. In addition, it is favorable that in a formation process of the pixel electrode 15 which is formed using a photolithography method, the third interlayer insulator film 14 is covered with an silicon oxide film which is doped with boron, and is chemically stable, so as to prevent the third interlayer insulator film 14 from being transformed and the film thickness from being changed. That is, the third interlayer insulator film 14 is configured of the first silicon oxide film near the storage capacitor 16 and the second silicon oxide film which is laminated on the first silicon oxide film and is doped with the boron.

Next, the contact hole CNT7, which penetrates the second interlayer insulator film 13 and the third interlayer insulator film 14, is formed in a position in which the contact hole CNT7 is overlapped with the second relay electrode 7b. A transparent conductive film such as an ITO, for example, is formed so as to coat the contact hole CNT7 and to cover the third interlayer insulator film 14 and is patterned, thereby forming the pixel electrode 15 which is electrically connected to the second relay electrode 7b through the contact hole CNT7.

According to the wiring structure of the element substrate 10, the drain electrode 32 of the TFT 30 is electrically connected to the pixel electrode 15 through the first relay electrode 6b, the contact hole CNT5, the second relay electrode 7b and the contact hole CNT7. In addition, the drain electrode 32 is electrically connected to the first electrode 16a of the storage capacitor 16 through the first relay electrode 6b, the contact hole CNT5, the second relay electrode 7b and the contact hole CNT6.

As shown in FIG. 6, in the aperture region of the pixel P, the base insulating film 10a, the first insulating film 11a, the second insulating film 11b, the first interlayer insulator film 12, the second interlayer insulator film 13, the translucent storage capacitor 16, the third interlayer insulator film 14 and the pixel electrode 15 which are sequentially formed on the transparent element substrate 10 are provided.

The element substrate 10 has a complicated layer (film) structure compared to the opposite substrate 20 due to having the configuration of the pixel circuit. Since the insulating films such as the base insulating film 10a, the first insulating film 11a, the second insulating film 11b, the first interlayer insulator film 12 and the second interlayer insulator film 13 are configured of the oxide (silicon oxide film), the nitride or the oxynitride of silicon described above, the insulating films have substantially the same refractive index (1.4 to 1.5 in a visible light region) as the quartz substrate, for example, when constituting the element substrate 10. Accordingly, since the refractive index is substantially the same, the visible light which transmits these layers (films) is hardly reflected and refracted in interfaces of the layers (films), whereby the optical intensity thereof (transmittance) is hardly attenuated.

With respect to the above, in the structure from the storage capacitor 16 to the pixel electrode 15, the dielectric layer 16b, configured of a transparent conductive film (in a case of an ITO, the refractive index is 1.5 to 1.9 in the visible light wavelength region), is interposed between the first electrode 16a and the second electrode 16c and the third interlayer insulator film 14, configured of the same transparent conductive film, is interposed between the second electrode 16c and the pixel electrode 15. That is, since the dielectric layer 16b and the third interlayer insulator film 14 in which the refractive indexes are different (low) to the transparent conductive films are interposed in the transparent conductive films, the visible light which transmits these layers (films) is reflected and refracted in the interfaces of the layers (films), whereby there are concerns that the optical intensity (transmittance) thereof may be attenuated. In addition, the film thickness of the dielectric layer 16b is arranged to be 20 nm to 30 nm from a viewpoint to secure the electrical capacitance as described above. Since the film thickness in this range does not influence the transmittance of the light in the aperture region, it can be ignored.

In this present embodiment, each of the film thicknesses of the pixel electrode 15, the first electrode 16a and the second electrode 16c as the pair of translucent electrodes and the third interlayer insulator film 14 are set so that spectral distributions of the light (transmitted light) which transmit the aperture regions of the pixels P respectively have peak transmittances corresponding to at least a red wavelength range (600 nm to 700 nm), a green wavelength range (500 nm to 600 nm) and a blue wavelength range (400 nm to 500 nm). Hereinafter, detailed embodiments and comparison examples are exemplified to be described.

Figure 8:
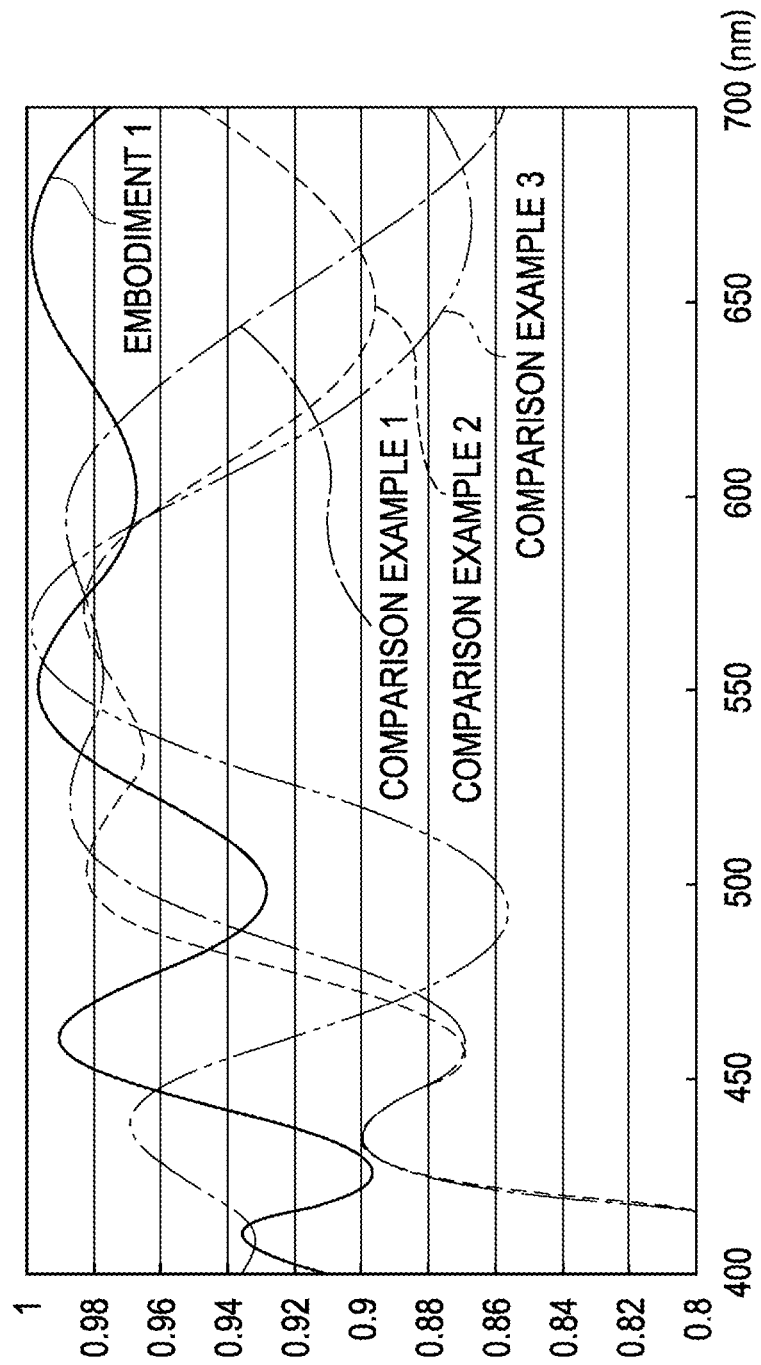
FIG. 8 is a graph which shows spectral distributions of transmitted light in the embodiment 1 and the comparison examples 1 to 3.
Figure 9:
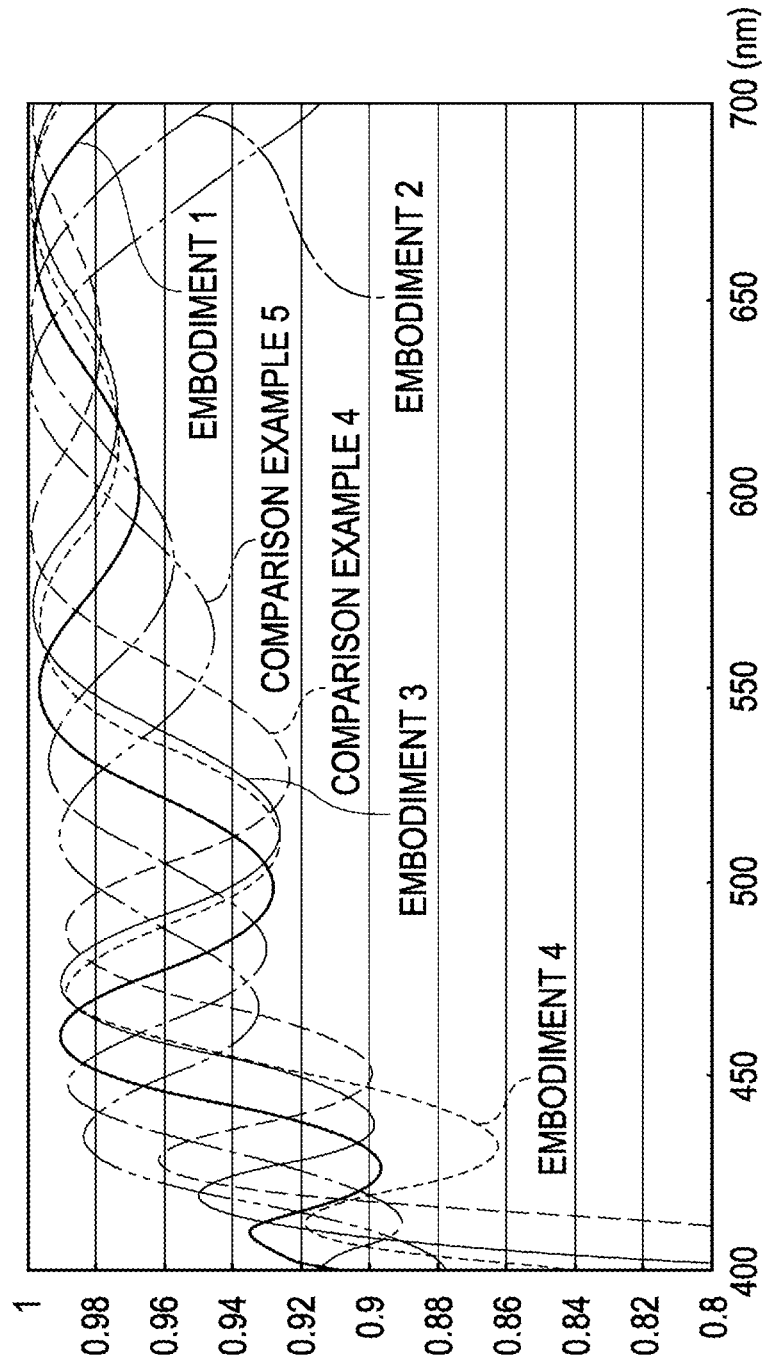
FIG. 9 is a graph which shows spectral distributions of transmitted light in the embodiments 1 to 4 and the comparison examples 4 and 5.
Figure 10:
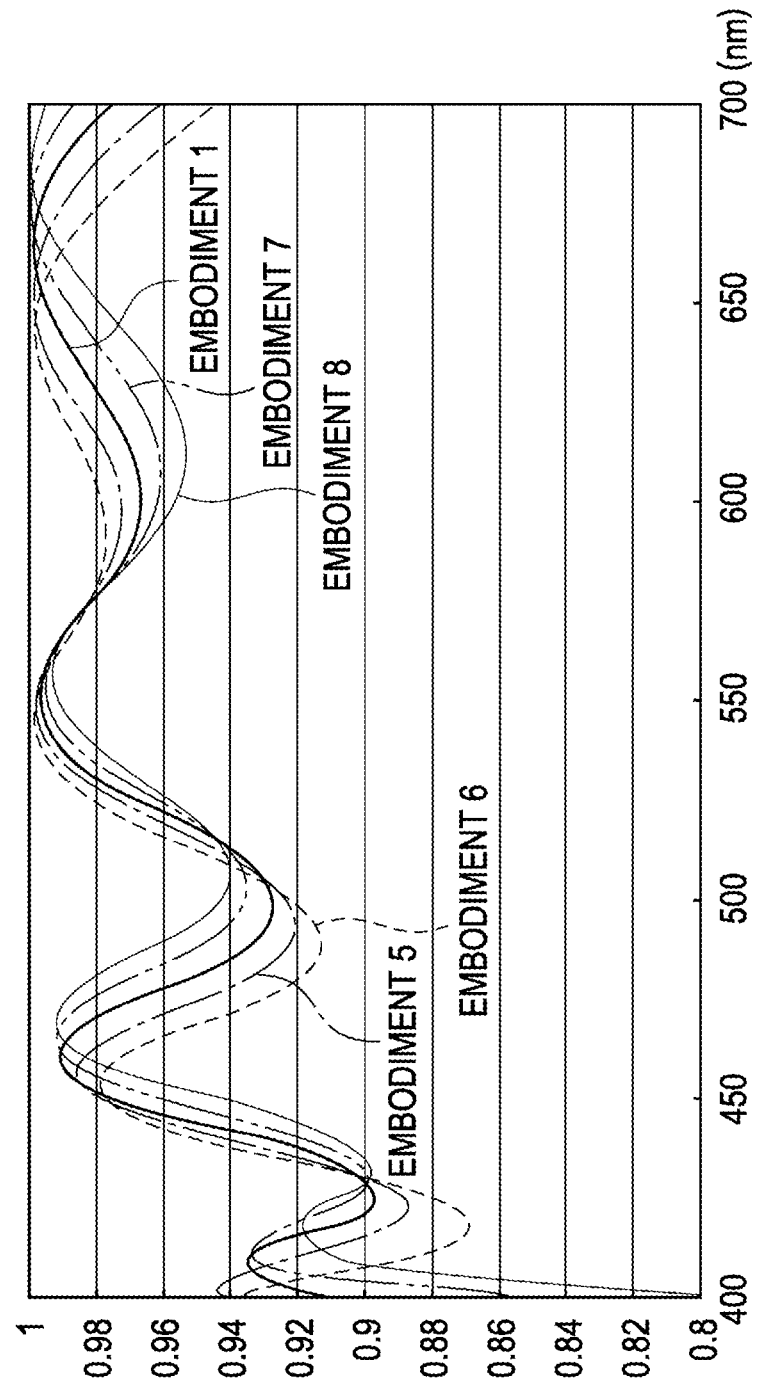
FIG. 10 is a graph which shows spectral distributions of transmitted light in the embodiment 1 and the embodiments 5 to 8.
Figure 11:
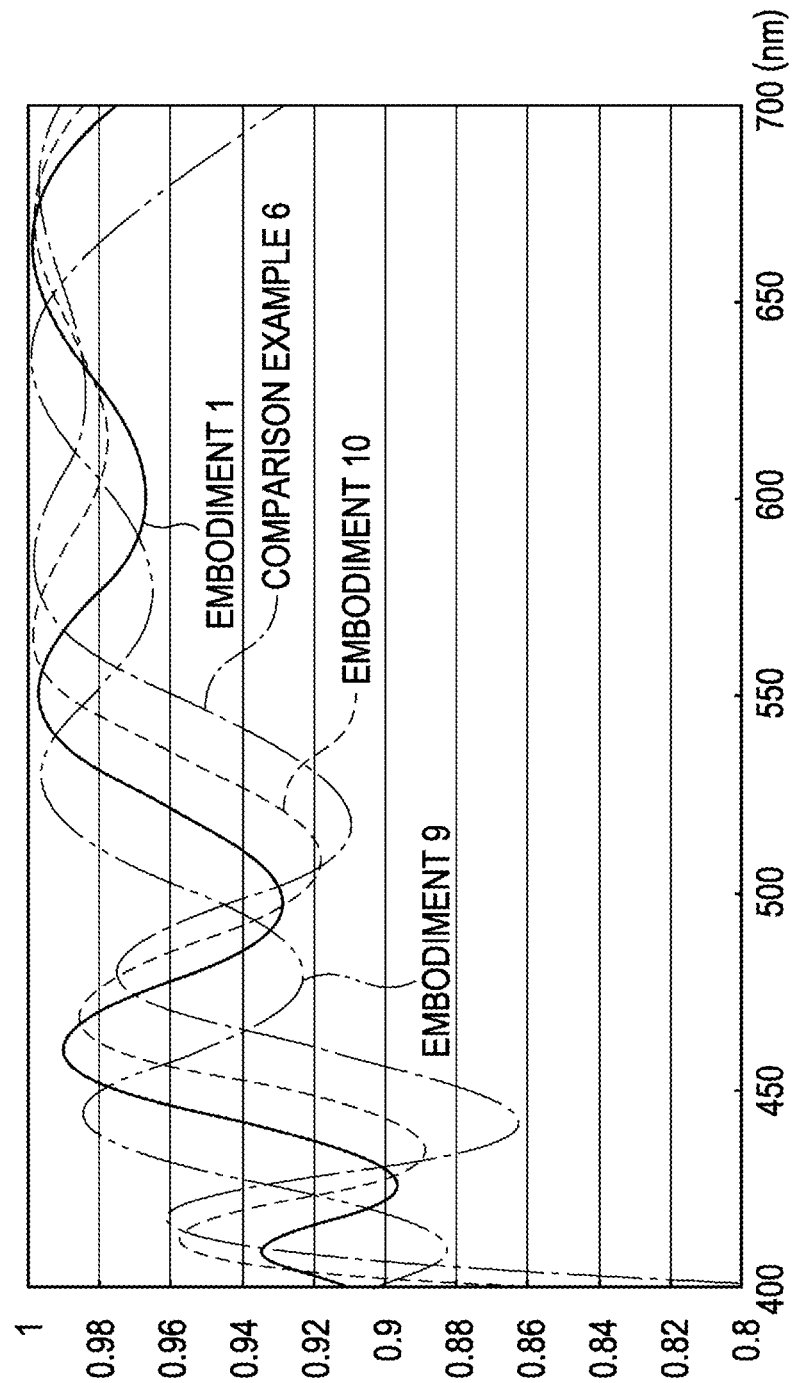
FIG. 11 is a graph which shows spectral distributions of transmitted light in the embodiments 1, 9 and 10 and the comparison example 6.

FIG. 7A is a table which shows film thicknesses of the first electrode, the second electrode, the third interlayer insulator film and the pixel electrode of an embodiment 1 to an embodiment 4, FIG. 7B is a table which shows film thicknesses of the first electrode, the second electrode, the third interlayer insulator film and the pixel electrode of an embodiment 5 to an embodiment 10 and FIG. 7C is a table which shows film thicknesses of the first electrode, the second electrode, the third interlayer insulator film and the pixel electrode of a comparison example 1 to a comparison example 6. FIG. 8 is a graph which shows spectral distributions of the transmitted light of the embodiment 1 and comparison examples 1 to 3, FIG. 9 is a graph which shows spectral distributions of the transmitted light of the embodiment 1 to the embodiment 4 and the comparison examples 4 and 5, FIG. 10 is a graph which shows spectral distributions of the transmitted light of the embodiment 1 and the embodiment 5 to the embodiment 8 and FIG. 11 is a graph which shows spectral distributions of the transmitted light of the embodiment 1, the embodiment 9, the embodiment 10 and the comparison example 6.

Hereinafter, the first electrode 16a, the second electrode 16c, the third interlayer insulator film 14 and the pixel electrode 15 of the embodiment 1 to the embodiment 10 and the comparison example 1 to the comparison example 6 will be described with reference to FIG. 7A to FIG. 7C.

Embodiment 1

In the embodiment 1, all of the first electrode 16a, the second electrode 16c and the pixel electrode 15 are configured of ITO films and the respective film thicknesses are 140 nm. The third interlayer insulator film 14 is configured by laminating the first silicon oxide film and the second silicon oxide film which is doped with the boron and the film thickness is 175 nm.

Embodiment 2

In the embodiment 2, the film thicknesses of the first electrode 16a, the second electrode 16c and the pixel electrode 15 are respectively arranged to be thinner by 5% (7 nm) than those in the embodiment 1 and are set to be 133 nm.

Embodiment 3

In the embodiment 3, the film thicknesses of the first electrode 16a, the second electrode 16c and the pixel electrode 15 are respectively arranged to be thicker by 5% (7 nm) than those in the embodiment 1 and are set to be 147 nm.

Embodiment 4

In the embodiment 4, the film thickness of the pixel electrode 15 is arranged to be thicker by 10% (14 nm) than that in the embodiment 1.

Embodiment 5

In the embodiment 5, the film thickness of the third interlayer insulator film 14 is arranged to be thinner by 5% (9 nm) than that in the embodiment 1 and is set to be 166 nm.

Embodiment 6

In the embodiment 6, the film thickness of the third interlayer insulator film 14 is arranged to be thinner by 10% (17 nm) than that in the embodiment 1 and is set to be 158 nm.

Embodiment 7

In the embodiment 7, the film thickness of the third interlayer insulator film 14 is arranged to be thicker by 5% (9 nm) than that in the embodiment 1 and is set to be 184 nm.

Embodiment 8

In the embodiment 8, the film thickness of the third interlayer insulator film 14 is arranged to be thicker by 10% (17 nm) than that in the embodiment 1 and is set to be 192 nm.

Embodiment 9

In the embodiment 9, the film thicknesses of the first electrode 16a, the second electrode 16c and the pixel electrode 15 are respectively arranged to be thinner by 5% (7 nm) than those in the embodiment 1 and are set to be 133 nm and the film thickness of the third interlayer insulator film 14 is arranged to be thinner by 5% (9 nm) than that in the embodiment 1 and is set to be 166 nm.

Embodiment 10

In the embodiment 10, the film thicknesses of the first electrode 16a, the second electrode 16c and the pixel electrode 15 are respectively arranged to be thicker by 5% (7 nm) than those in the embodiment 1 and are set to be 147 nm and the film thickness of the third interlayer insulator film 14 is arranged to be thinner by 5% (9 nm) than that in the embodiment 1 and is set to be 166 nm.

Comparison Example 1

In the comparison example 1, the film thickness of the third interlayer insulator film 14 is arranged to be thinner by about 43% (75 nm) than that in the embodiment 1 and is set to be 100 nm.

Comparison Example 2

In the comparison example 2, the film thickness of the third interlayer insulator film 14 is arranged to be thicker by about 43% (75 nm) than that in the embodiment 1 and is set to be 250 nm.

Comparison Example 3

In the comparison example 3, the film thicknesses of the first electrode 16a, the second electrode 16c and the pixel electrode 15 are respectively arranged to be thinner by 29% (40 nm) than those in the embodiment 1 and are set to be 100 nm.

Comparison Example 4

In the comparison example 4, the film thicknesses of the first electrode 16a, the second electrode 16c and the pixel electrode 15 are respectively arranged to be thinner by 10% (14 nm) than those in the embodiment 1 and are set to be 126 nm.

Comparison Example 5

In the comparison example 5, the film thicknesses of the first electrode 16a, the second electrode 16c and the pixel electrode 15 are respectively arranged to be thicker by 10% (14 nm) than those in the embodiment 1 and are set to be 154 nm.

Comparison Example 6

In the comparison example 6, the film thicknesses of the first electrode 16a, the second electrode 16c and the pixel electrode 15 are respectively arranged to be thicker by 10% (14 nm) than those in the embodiment 1 and are set to be 154 nm and the film thickness of the third interlayer insulator film 14 is arranged to be thinner by about 10% (17 nm) than that in the embodiment 1 and is set to be 158 nm.

Hereinafter, the spectral distributions of the light (transmitted light) which transmits the aperture region regarding the embodiment 1 to the embodiment 10 and the comparison example 1 to the comparison example 6 are obtained by performing optical simulation. In addition, in the graphs of the spectral distributions shown in FIG. 8 to FIG. 11, the peak value of the transmittance in the red wavelength range (600 nm to 700 nm) in the embodiment 1 is indexed as 1. Here, regarding the optical simulation which obtains the spectral distribution of the transmitted light, the validity of the simulation is verified by comparing with results, in which spectral characteristics of samples (trial products) which correspond to the film thickness configurations of each of the embodiments and the comparison examples, are virtually measured.

As shown in FIG. 8, the spectral distribution in the embodiment 1 has the peak transmittances in the red wavelength range (600 nm to 700 nm), the green wavelength range (500 nm to 600 nm) and the blue wavelength range (400 nm to 500 nm). Accordingly, high transmittances are realized over the visible light region. In particular, the peak wavelength of red is about 660 nm, the peak wavelength of green is about 550 nm, the peak wavelength of blue is about 460 nm, the peak transmittances are respectively shown in the representative wavelength which corresponds to so-called three primary colors and it can be said that the peaks are close to an ideal state when considering color reproducibility. Therefore, hereinafter, other embodiments and comparison examples will be described based on the embodiment 1 as a reference.

In the comparison example 1 in which the film thickness of the third interlayer insulator film 14 is arranged to be thinner by about 43% and the comparison example 2 in which the film thickness of the third interlayer insulator film 14 is arranged to be thicker by about 43% than that in the embodiment 1, the peak transmittances are commonly shown in the green wavelength range (500 nm to 600 nm) and the blue wavelength range (400 nm to 500 nm), however, the peak transmittance is not shown in the red wavelength range (600 nm to 700 nm) and the transmittance is noticeably lowered compared to that in the green wavelength range (500 nm to 600 nm). In addition, the transmittance in the blue wavelength range (400 nm to 500 nm) is also noticeably lowered compared to that in the embodiment 1.

In the comparison example 3 in which the film thicknesses of the first electrode 16a, second electrode 16c and the pixel electrode 15 are respectively arranged to be thinner by 29% than those in embodiment 1, the peak transmittances in the green wavelength range (500 nm to 600 nm) and the blue wavelength range (400 nm to 500 nm) are shown, however, the peak transmittance in the red wavelength range (600 nm to 700 nm) is not shown and of course, the transmittance is noticeably lowered compared to that in the green wavelength range (500 nm to 600 nm). In other words, a fluctuation range of the transmittance in the visible light wavelength range is greater.

As shown in FIG. 9, in the embodiment 2 and the embodiment 3 in which the film thicknesses of the first electrode 16a, second electrode 16c and the pixel electrode 15 are respectively arranged to be thinner by 5% and to be thicker by 5% than those in the embodiment 1, the peak transmittances are commonly shown in the respective red wavelength range (600 nm to 700 nm), green wavelength range (500 nm to 600 nm) and the blue wavelength range (400 nm to 500 nm) in the same manner as the embodiment 1. The transmittance of the peak is also the same. In addition, the fluctuation range of the transmittance in the visible light wavelength range is substantially the same as that in the embodiment 1.

In the comparison example 4 in which the film thicknesses of the first electrode 16a, second electrode 16c and the pixel electrode 15 are respectively arranged to be thinner by 10% than those in the embodiment 1, the peak transmittances are shown in the respective red wavelength range (600 nm to 700 nm), green wavelength range (500 nm to 600 nm) and blue wavelength range (400 nm to 500 nm). However, in the blue wavelength range (400 nm to 500 nm), the peak wavelength of the transmittance is 490 nm and the transmittance is lowered than that in the embodiment 1 in the wavelength range which is smaller than 490 nm. In addition, the peak transmittance is shown near 430 nm, however, since in many cases, the wavelength which is smaller than 430 nm is cut and hardly used in practice, it is hard to say that sufficient transmittances can be secured. That is, from a viewpoint that insufficient optical intensity (light quantity) of blue occurs, the transmittance is inferior to that in the embodiment 1.

In the embodiment 4 in which only the film thickness of the pixel electrode 15 among the first electrode 16a, second electrode 16c and the pixel electrode 15, configured of the ITO films, is arranged to be thicker by 10% than that in the embodiment 1, the peak transmittances are shown in the respective red wavelength range (600 nm to 700 nm), green wavelength range (500 nm to 600 nm) and blue wavelength range (400 nm to 500 nm). In comparison with those in the comparison example 4, since the peak wavelength of the transmittance in the blue wavelength range (400 nm to 500 nm) becomes smaller to 470 nm, the transmittance in the blue wavelength range (400 nm to 500 nm) becomes better0 nm0 nm. Such a tendency is shown in the same manner even in the spectral distribution when the film thickness of the first electrode 16a or the second electrode 16c is arranged to be thicker by 10% than that in the embodiment 1, even though the case is not shown in FIG. 9.

In addition, in the comparison example 5 in which the film thicknesses of the first electrode 16a, the second electrode 16c and the pixel electrode 15 are respectively arranged to be thicker by 10% than those in the embodiment 1, the peak transmittances in the respective red wavelength range (600 nm to 700 nm), green wavelength range (500 nm to 600 nm) and blue wavelength range (400 nm to 500 nm) are shown, however, the respective peak transmittances are shifted near the short wavelength in each wavelength range. In the same manner as those in the comparison example 4, if the wavelength shorter than 430 nm is cut and hardly used, the insufficient optical intensity of blue (light quantity) occurs in comparison with that in the embodiment 1.

As shown in FIG. 10, in the embodiment 5 in which the film thickness of the third interlayer insulator film 14 is arranged to be thinner by 5% and the embodiment 7 in which the film thickness is arranged to be thicker by 5% than that in embodiment 1, the peak transmittances are shown in the red wavelength range (600 nm to 700 nm), the green wavelength range (500 nm to 600 nm) and the blue wavelength range (400 nm to 500 nm) in the same manner as those in the embodiment 1. The transmittances of the peaks are substantially the same. In addition, the fluctuation range of the transmittance in the visible light wavelength range is also substantially the same as that in the embodiment 1.

Also in the embodiment 6 in which the film thickness of the third interlayer insulator film 14 is arranged to be thinner by 10% and the embodiment 8 in which the film thickness is arranged to be thicker by 10% than that in embodiment 1, the peak transmittances are shown in the red wavelength range (600 nm to 700 nm), the green wavelength range (500 nm to 600 nm) and the blue wavelength range (400 nm to 500 nm) in the same manner as those in the embodiment 1. The transmittances of the peaks are also substantially the same. In addition, the fluctuation range of the transmittance in the visible light wavelength range becomes slightly greater in comparison with those in the embodiment 5 and the embodiment 7, however, the peak wavelength of the transmittance is not shifted to the extent of that in the embodiment 1 and therefore it can be said that the wavelength is a level which does not cause problems in practical use.

As shown in FIG. 11, in the embodiment 9 in which the film thicknesses of the first electrode 16a, the second electrode 16c and the pixel electrode 15 and the film thickness of the third interlayer insulator film 14 are respectively arranged to be thinner by 5% than those in the embodiment 1 and the embodiment 10 in which the film thicknesses of the first electrode 16a, the second electrode 16c and the pixel electrode 15 are respectively arranged to be thicker by 5% and the film thickness of the third interlayer insulator film 14 is arranged to be thinner by 5% than those in the embodiment 1, the fluctuation range of the transmittance in the visible light wavelength range becomes slightly greater than that in the embodiment 1, however, the peak transmittances are respectively shown in the red wavelength range (600 nm to 700 nm), the green wavelength range (500 nm to 600 nm), and the blue wavelength range (400 nm to 500 nm) in the same manner as those in the embodiment 1. The transmittances of the peak are also substantially the same in the same manner.

In the comparison example 6 in which the film thicknesses of the first electrode 16a, the second electrode 16c and the pixel electrode 15 are respectively arranged to be thicker by 10% and the film thickness of the third interlayer insulator film 14 is arranged to be thinner by 10% than those in the embodiment 1, the peak transmittances are respectively shown in the red wavelength range (600 nm to 700 nm), the green wavelength range (500 nm to 600 nm), and the blue wavelength range (400 nm to 500 nm), however, the respective peak transmittances are shifted near the longer wavelength in each wavelength range. In the same manner as the comparison example 4 in which the film thicknesses of the first electrode 16a, the second electrode 16c and the pixel electrode 15 are respectively arranged to be thinner by 10%, if the wavelength shorter than 430 nm is cut and hardly used, a more insufficient optical intensity of blue (light quantity) than that in the embodiment 1 occurs.

According to the spectral distributions of the embodiment 1 to the embodiment 10 and the comparison example 1 to the comparison example 6, it is favorable that one film thickness among the first electrode 16a, the second electrode 16c and the pixel electrode 15, configured of the ITO films, are set to be within a range of 140 nm±10% and the film thicknesses of the other electrodes are set to be within a range of 140 nm±5% and the film thickness of the third interlayer insulator film 14, configured of the silicon oxide, is within a range of 175 nm±10% in order to secure high transmittance in the visible light wavelength range. Furthermore, it is favorable that the film thicknesses of the first electrode 16a, the second electrode 16c, and the pixel electrode 15, configured of the ITO films, are respectively within a range of 140 nm±5% and the film thickness of the third interlayer insulator film 14, configured of the silicon oxide, is within a range of 175 nm±5%.

Here, the red wavelength range (600 nm to 700 nm), the green wavelength range (500 nm to 600 nm), and the blue wavelength range (400 nm to 500 nm) according to the present embodiment are not limited thereto and when the liquid crystal device 100 is used as an optical modulator (light valve) of a projection display device (liquid crystal projector) as an electronic apparatus which will be described later, for example, it is favorable that the ranges are set corresponding to the spectral distribution of colored light of red, green and blue which are obtained from a light source. In addition, by narrowing each of the wavelength ranges of the colored light of red, green and blue further than the optical wavelength ranges of the three primary colors which are generally displayed, it is possible to improve color purity. In other words, the film thicknesses of the first electrode 16a, the second electrode 16c, the pixel electrode 15 and the third interlayer insulator film 14 may be managed to be within the narrower range based on those in the embodiment 1, for example, as the standard so as to generate the peak transmittances in each of the narrowed wavelength ranges.

According to the present embodiment described above, effects as below are obtained.

(1) In the liquid crystal device 100, one film thickness among the first electrode 16a, the second electrode 16c, and the pixel electrode 15, disposed in the aperture regions of the pixels P and configured of the ITO films, are within a range of 140 nm±10% and the film thicknesses of other electrodes are within a range of 140 nm±5% and the film thickness of the third interlayer insulator film 14, configured of silicon oxide, is within a range of 175 nm±10%. Therefore, the spectral distribution of the light which transmits the aperture region of the pixel P shows the peak transmittances in the respective red wavelength range (600 nm to 700 nm), the green wavelength range (500 nm to 600 nm), and the blue wavelength range (400 nm to 500 nm). Accordingly, it is possible to provide the translucent liquid crystal device 100 in which the high transmittance is realized over the visible light wavelength range.

(2) In the liquid crystal device 100, the third interlayer insulator film 14, provided between the storage capacitor 16 and the pixel electrode 15, is configured of the first silicon oxide film near the storage capacitor 16 and the second silicon oxide film which is laminated on the first silicon oxide film and is doped with boron. Accordingly, since the first silicon oxide film is covered with the second silicon oxide film which is doped with boron and is chemically stable, even when the pixel electrode 15 is subsequently formed using the photo lithography method or the like, it is possible to avoid problems in which the third interlayer insulator film 14 is transformed and the film thickness is changed due to etching. That is, by making the third interlayer insulator film 14 which includes the stable film quality and the film thickness, as a result, it is possible to secure the high and stable transmittance in the pixels P.

Second Embodiment

Electronic Apparatus

Figure 12:
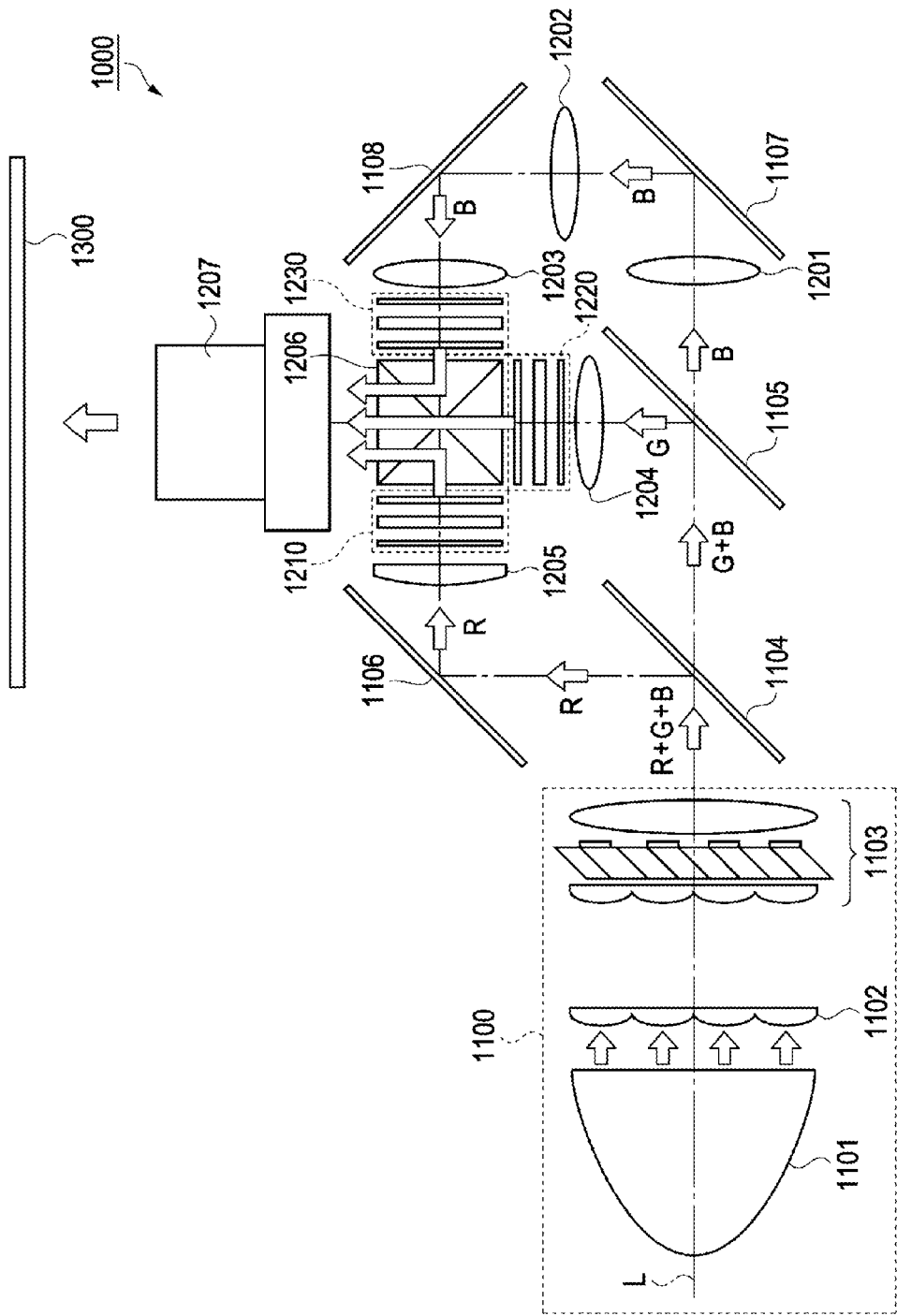
FIG. 12 is a schematic diagram which shows a configuration of a projection display device as an electronic apparatus.

FIG. 12 is a schematic diagram which shows a configuration of a projection display device as an electronic apparatus. As shown in FIG. 12, the projection type display device 1000 as the electronic apparatus according to the present embodiment includes a polarized light illumination device 1100 disposed along a system optical axis L, two dichroic mirrors 1104 and 1105 as an optical isolation element, three reflecting mirrors 1106, 1107 and 1108, five relay lenses 1201, 1202, 1203, 1204 and 1205, three translucent liquid crystal light valves 1210, 1220 and 1230 as three optical modulators, a cross dichroic prism 1206 as a light synthesizing element and a projection lens 1207.

The polarized light illumination device 1100 is schematically configured of a lamp unit 1101 as a light source, configured by a white light source such as an ultrahigh pressure mercury lamp or a halogen lamp, an integrator lens 1102 and a polarization converting element 1103.

The dichroic mirror 1104 reflects red light (R) and transmits green light (G) and blue light (B) in a polarized light flux which is emitted from the polarized light illumination device 1100. The other dichroic mirror 1105 reflects the green light (G) which transmits the dichroic mirror 1104 and transmits the blue light (B).

The red light (R) which is reflected by the dichroic mirror 1104 is incident to the liquid crystal light valve 1210 via the relay lens 1205 after being reflected by the reflecting mirror 1106.

The green light (G) which is reflected by the dichroic mirror 1105 is incident to the liquid crystal light valve 1220 via the relay lens 1204.

The blue light (B) which transmits the dichroic mirror 1105 is incident to the liquid crystal light valve 1230 via a light guiding system configured of the three relay lenses 1201, 1202 and 1203 and the two reflecting mirrors 1107 and 1108.

The liquid crystal light valves 1210, 1220 and 1230 are respectively disposed to face incident surfaces of each colored light of the cross dichroic prism 1206. The colored light incident to the liquid crystal light valves 1210, 1220 and 1230 is modulated on the basis of image information (image signal) and is emitted forward the cross dichroic prism 1206. The prism is configured that four rectangular prisms are attached to each other and a dielectric multilayer film which reflects red colored light therein and a dielectric multilayer film which reflects blue colored light are formed in a cross shape. The three colored light is synthesized by the dielectric multilayer films and light which represents color images is synthesized. The synthesized light is projected on a screen 1300 by the projection lens 1207, which is a projection optical system, and the image is enlarged and displayed.

The liquid crystal device 100 according to the first embodiment described above is applied to the liquid crystal light valve 1210. The liquid crystal device 100 is disposed in the incident side and the emitted side of the colored light while having space between a plurality of polarization elements disposed in a crossed Nicol prism. Other liquid crystal light valves 1220 and 1230 also have the same configurations.

According to the projection display device 1000, in the aperture region of the pixel P, since the liquid crystal device 100 in which high transmittances can be obtained with respect to each colored light of red, green and blue is used as the liquid crystal light valves 1210, 1220 and 1230, the light which is emitted from the polarized light illumination device 1100 may be efficiently used and bright display quality may be realized.

In addition, that the high transmittance can be obtained in the aperture region of the pixel P means that the reflectance of the light which transmits the aperture region is lowered. By doing so, since a probability in which the reflected light may transmit the liquid crystal layer 50 again decreases, light resistant life span (for example, light degradation of the liquid crystal layer 50 and the oriented films 18 and 24) when the liquid crystal device 100 is used as the liquid crystal light valves 1210, 1220 and 1230 is improved.

Here, it is favorable that the film thicknesses of the first electrode 16a, the second electrode 16c, the pixel electrode 15 and the third interlayer insulator film 14 and the ranges thereof in the liquid crystal device 100 are respectively set so that the peak wavelength of the transmittance of the light which transmits the pixel P substantially matches the peak wavelength of the optical intensity of the spectral distribution of the red light (R), the green light (G) and the blue light (B) in the polarized light flux, which is emitted from the polarized light illumination device 1100 as the light source. According to the above, it is possible to further improve light use efficiency. In addition, "to be substantially matched" indicates a state that the peak transmittance of the colored light which transmits the pixel P is shown in the ±5% wavelength range with respect to the peak wavelength of the optical intensity of the colored light which is emitted from the light source.

Moreover, for example, in a case when the spectral distribution of the blue light (B) is set in a range of 430 nm to 500 nm by cutting the ultraviolet light of which the wavelength is smaller than 430 nm and the light resistant life span of the liquid crystal device 100 is further improved, the film thicknesses of the first electrode 16a, the second electrode 16c, the pixel electrode 15 and the third interlayer insulator film 14 and the ranges thereof are respectively set so that the peak transmittances are shown in the wavelength ranges.

The invention is not limited to the embodiment described above, but may be appropriately changed in the scope of the claims and the scope of the spirit of the invention can be understood from the entire specification and the electronic apparatus, in which such changed liquid crystal device 100 and the liquid crystal device 100 are applied, is also included in a technical range of the invention.

Various modifications in addition to the embodiments described above can be considered. Hereinafter, the modifications are described.

Modification 1

The first electrode 16a and the second electrode 16c which are the pair of translucent electrodes of the storage capacitor 16 and the pixel electrode 15 are not limited to use the ITO films as the transparent conductive film and may use IZO (Indium Zinc Oxide).

Modification 2

The third interlayer insulator film 14 as the interlayer insulator film of the invention is not limited to the laminated body configured of the first silicon oxide film and the second silicon oxide film which is doped with the boron and may use a single layer configured of the silicon oxide film or silicon oxynitride film.

Modification 3

The semiconductor layer 30a of the TFT 30 in the liquid crystal device 100 described above is not limited to be disposed so as to be overlapped with the scanning line 3a. For example, even when the semiconductor layer 30a is disposed to be overlapped with the data line 6a and to be overlapped with the scanning line 3a and the data line 6a by being bent in the middle thereof, the configuration of the storage capacitor 16, the third interlayer insulator film 14 and the pixel electrode 15 of the present application can be applied.

Modification 4

The electro-optical device which can be applied to the invention is not limited to the liquid crystal device 100. For example, the invention can be applied to an organic EL (electroluminescence) device of a bottom emission method which is provided with a function layer including a light emitting layer on the pixel electrode 15 and a negative pole so that the light emission is emitted to the side of the element substrate 10 provided with the pixel electrode 15.

Modification 5

The electronic apparatus to which the liquid crystal device 100 is applied is not limited to the projection display device 1000 of the embodiment described above. For example, the electronic apparatus can be favorably used as a projection type HUD (Head Up Display), a direct viewing type HMD (Head Mounted Display) or a display portion of information terminal equipment of an electronic book, a personal computer, a digital still camera, a liquid crystal television, a viewfinder type or monitor direct viewing type video camera, a car navigation system, an electronic organizer, a POS or the like. In addition, when the electronic apparatus is applied, the film thicknesses of the first electrode 16a, the second electrode 16c, the pixel electrode 15 and the third interlayer insulator film 14 and the ranges thereof are respectively set so that the peak transmittances of the light which transmits the pixel P match the peak wavelength of the optical intensity of at least red, green and blue in the spectral distribution of the light of the light source which illuminates the transmission type liquid crystal device 100.

The entire disclosure of Japanese Patent Application No. 2011-160718, filed Jul. 22, 2011 is expressly incorporated by reference herein.

What is claimed is:

1. An electro optical device comprising:
    a substrate;
    a pixel electrode that constitutes a pixel;
    a storage capacitor that includes a dielectric layer and a pair of electrodes, the dielectric layer being disposed between the pair of electrodes; and
    an interlayer insulating layer that is disposed between the storage capacitor and the pixel electrode,
    wherein a spectral distribution of intensity versus wavelength of a light transmitting through an aperture of the pixel has a first peak intensity in a red wavelength range, a second peak intensity in a green wavelength range, and a third peak intensity in a blue wavelength range.

2. The electro optical device according to claim 1, wherein the red wavelength range is 600 to 700 nm, the green wavelength range is 500 to 600 nm, and the blue wavelength range is 400 to 500 nm.

3. The electro optical device according to claim 1, wherein thicknesses of the pixel electrode, the pair of electrodes, and the interlayer insulating layer are fixed so that the intensity of the light transmitting through the aperture of the pixel has the first peak in the red wavelength range, the second peak in the green wavelength range, and the third peak in the blue wavelength range.

4. The electro optical device according to claim 1, wherein the pixel electrode and the pair of electrodes are ITO films, a film thickness of one of the ITO films is in a range of 140 nm±10%,
    a film thickness of another of the ITO films is in a range of 140 nm±5%, and
    the interlayer insulating layer is a silicon oxide film, a film thickness of the silicon oxide film being in a range of 175 nm±10%.

5. The electro optical device according to claim 1, wherein the interlayer insulating film includes a first silicon oxide film and a second silicon oxide film, the first silicon oxide film being disposed at a side of the storage capacitor which faces the pixel electrode, and the second silicon oxide film including boron and being disposed between the first silicon oxide film and the pixel electrode.

* * * * *